United States Patent [19]

Fredd et al.

[11] 3,778,089
[45] Dec. 11, 1973

[54] PIPE COUPLING
[75] Inventors: John V. Fredd, Dallas, Tex.
[73] Assignee: Otis Engineering Corporation, Dallas, Tex.
[22] Filed: Mar. 22, 1971
[21] Appl. No.: 126,539

[52] U.S. Cl. ................ 285/39, 285/94, 285/137 A, 285/169, 285/332.3, 285/357, 285/392
[51] Int. Cl. ............................................ F16l 39/04
[58] Field of Search .................. 285/357, 32, 323, 285/392, 356, 355, 39, 94, 168, 169, 332.3

[56] References Cited
UNITED STATES PATENTS

| | | | |
|---|---|---|---|
| 2,210,826 | 8/1940 | Williams | 285/94 |
| 426,922 | 4/1890 | Cook | 285/94 X |
| 1,372,876 | 3/1921 | Freund | 285/357 |
| 426,922 | 4/1890 | Cook | 285/94 X |
| 1,707,087 | 3/1929 | Little | 285/357 X |
| 1,517,893 | 12/1924 | Elder | 285/32 |
| 2,631,871 | 3/1953 | Stone | 285/106 |
| 1,517,893 | 12/1924 | Elder | 285/32 |
| 2,457,648 | 12/1948 | Donner | 285/323 |
| 1,822,887 | 9/1931 | Hagstedt | 285/357 |

*Primary Examiner*—Thomas F. Callaghan
*Attorney*—H. Mathews Garland

[57] ABSTRACT

A pipe coupling for connection of a pair of longitudinally spaced pipe ends without rotation of either of the pipes connected by the well heads with service facilities at the surface or along the ocean floor. The coupling may also connect pipe members to provide a leakproof union allowing rotation of one pipe relative to the other. The coupling includes a first outer pipe section having inner threads and a second inner pipe section having external threads, at least one of such threads being tapered. The pipe sections are joined together by a threaded gland having inner threads mating with the threads on the inner pipe section and external threads mating with the inner threads on the outer pipe section. The gland has an extension projecting over the inner pipe section from the overlapping portions of the two pipe sections for engagement of a tool to turn the gland. One of the threaded connections with the gland stresses the gland sufficiently to tighten the other threaded connection with the gland. One form of coupling employing the invention comprises an extension joint for connecting spaced pipe ends. Another pipe joint embodying the invention permits two pipe sections to be aligned and the connection between them tightened by the gland without rotation of the sections themselves. Additional specific applications of the coupling shown comprise multiple section articulated pipe assemblies which are readily deformable to provide turns both within a given plane and between different planes in a universal joint type manner. The articulated pipe assemblies are especially suited to connection of underwater wee heads with service facilities at the surface or along the ocean floor. Additional specific applicatins of th coupling shwwn comprise multiple section articulated pipe assemblies which are readily deformable to provide turns both within a given plane and between different planes in a universal join type manner. The articulated pipe assemblies are especially suited to connection of underwater well heads with service facilities at the surface or along the ocean floor.

2 Claims, 12 Drawing Figures

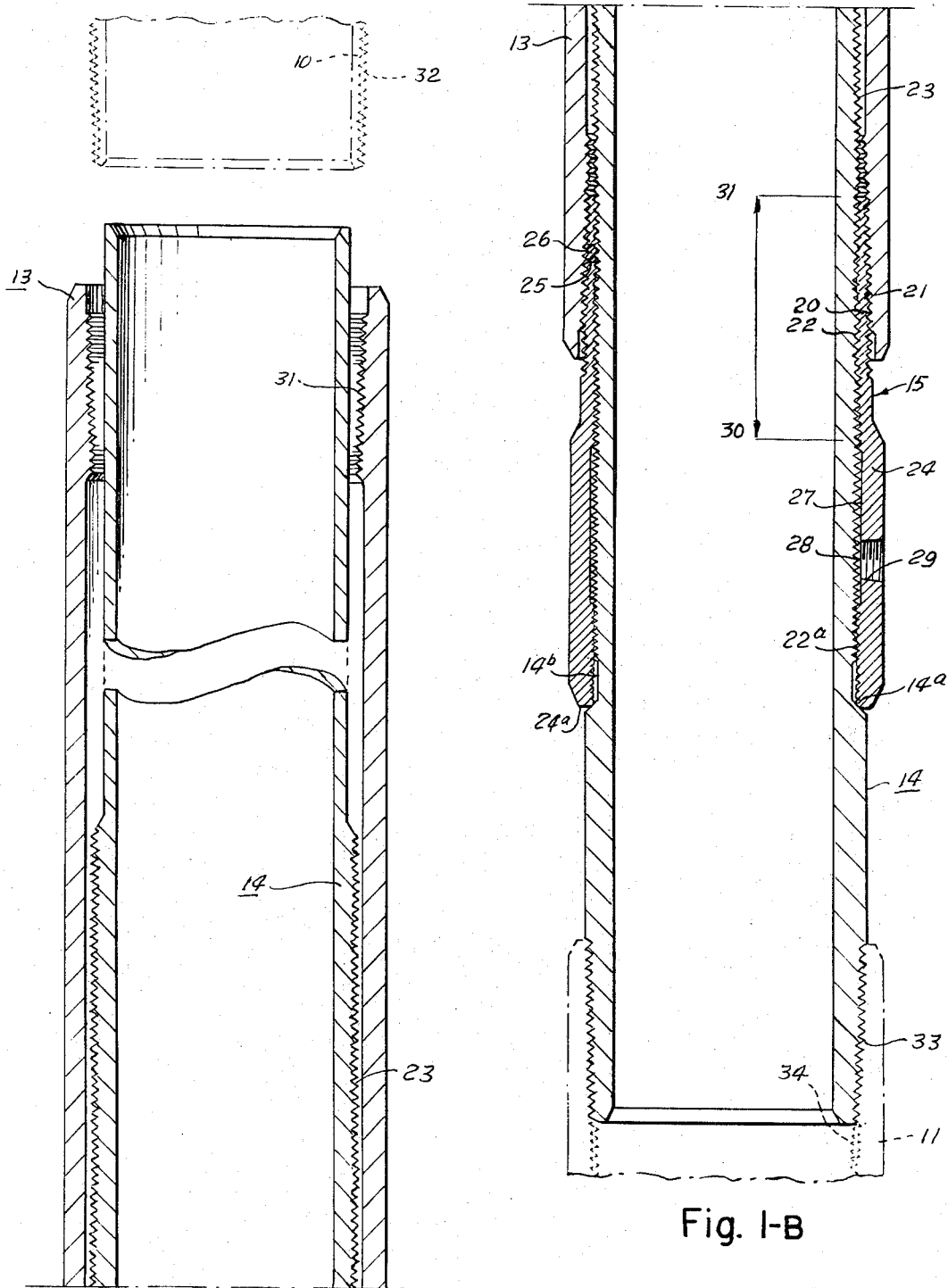

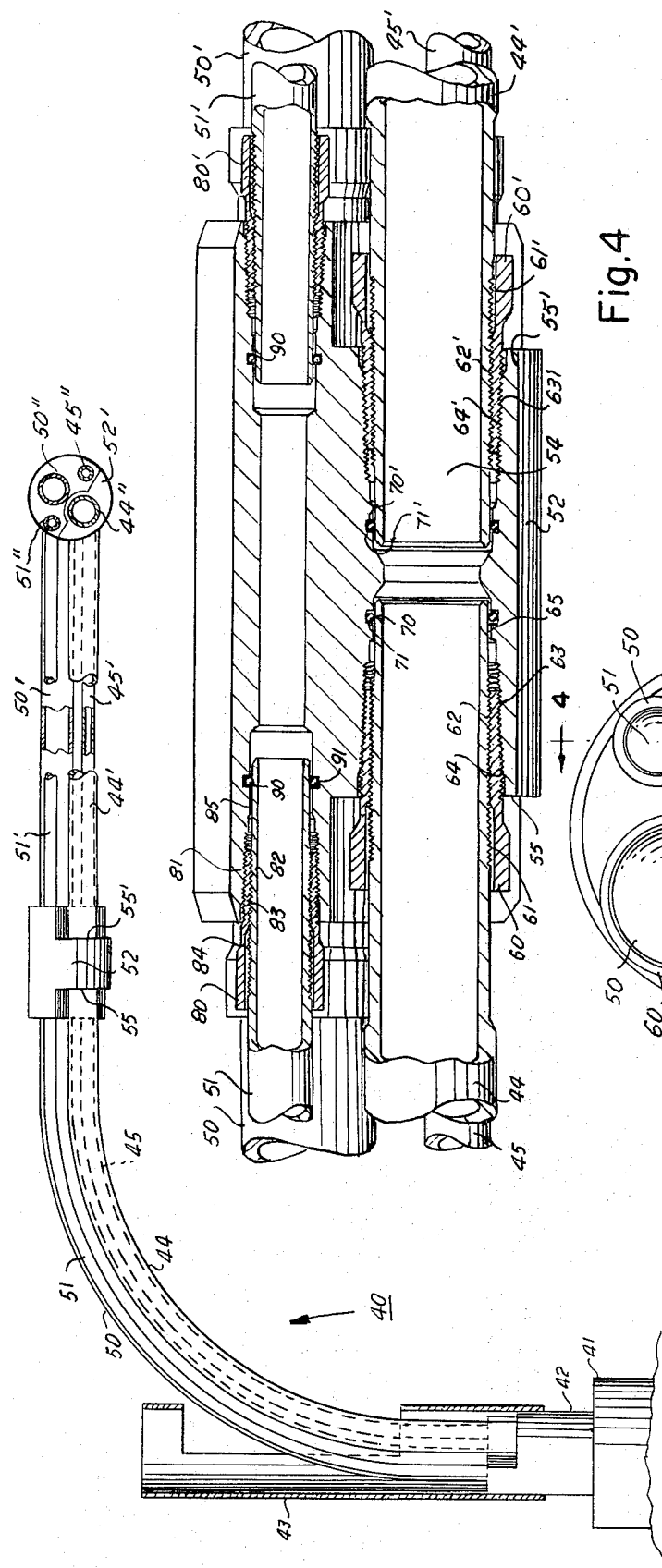

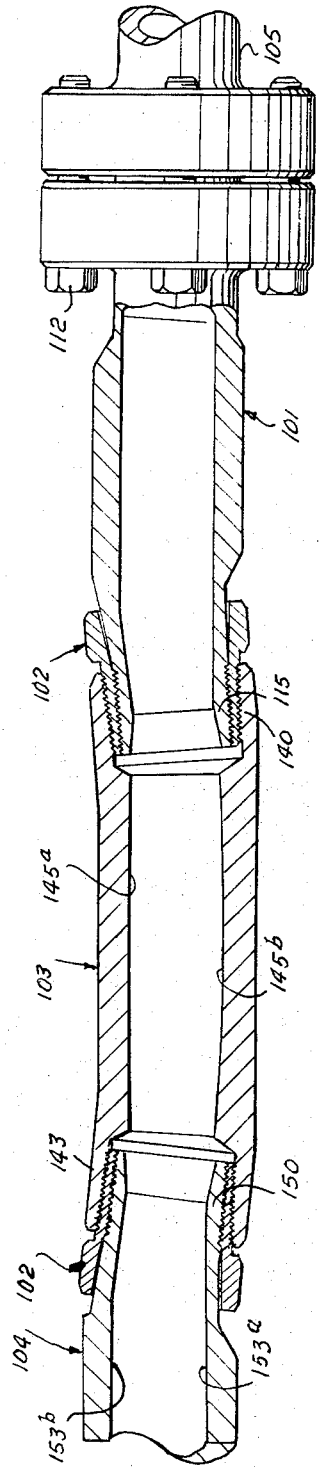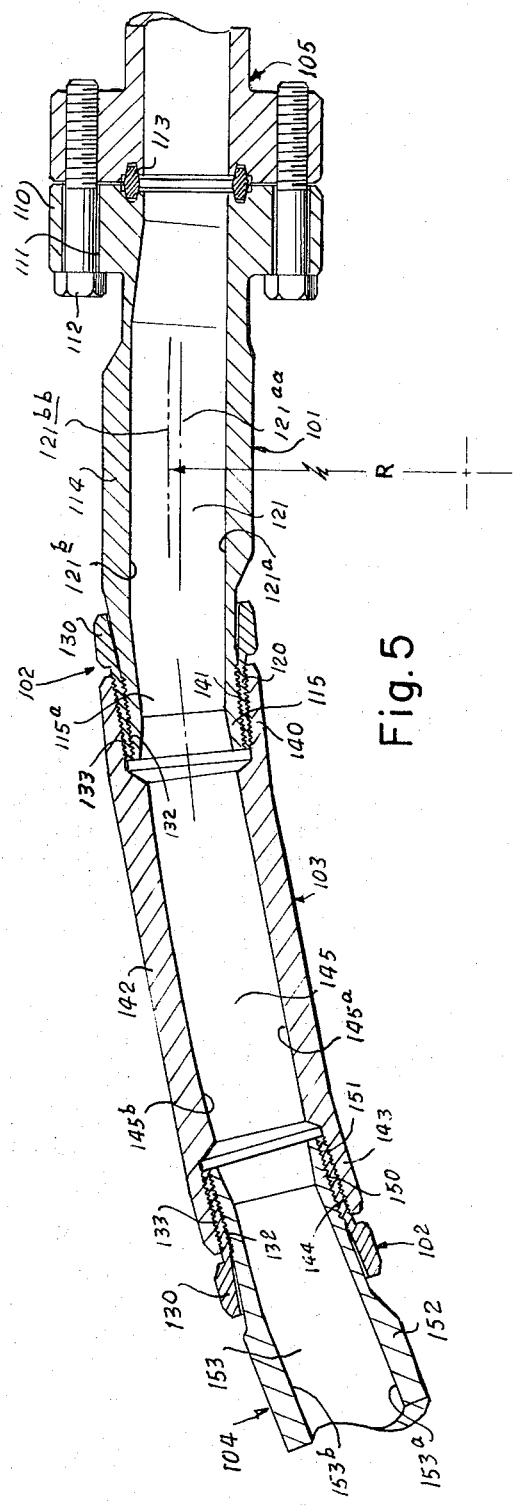

INVENTOR.
John V. Fredd

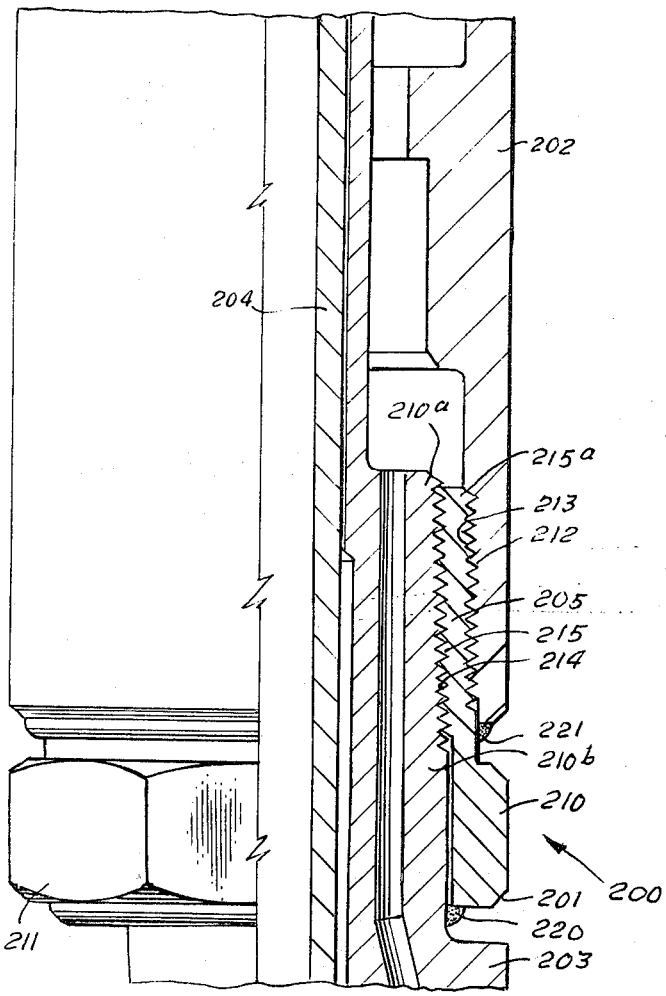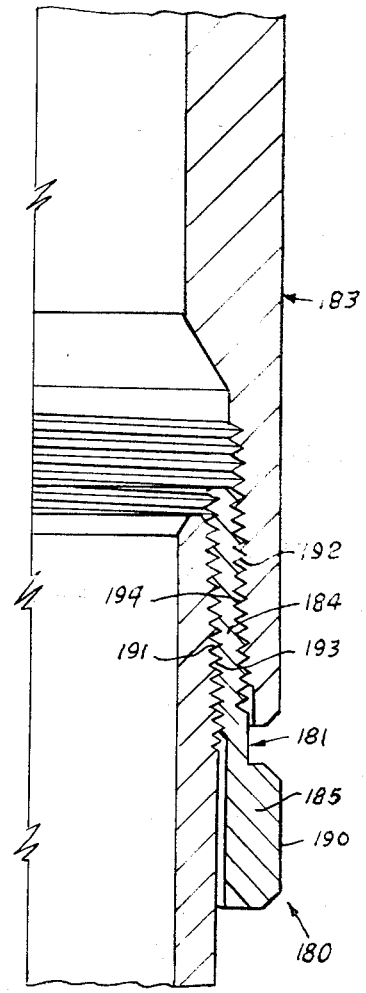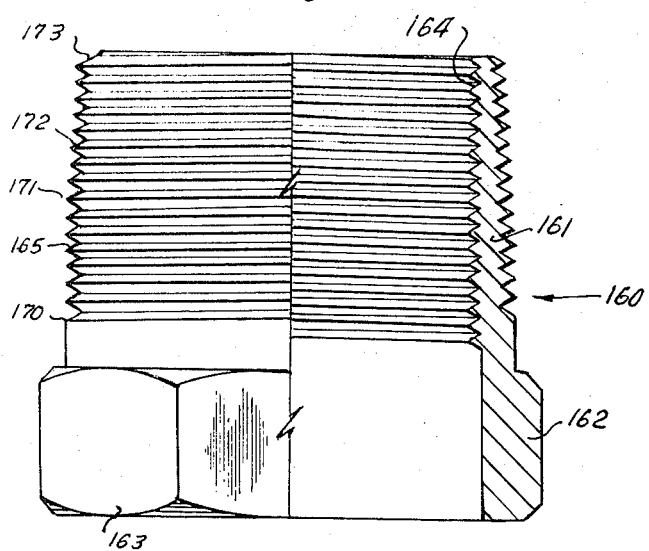
Fig. 11
Fig. 10
Fig. 9
INVENTOR
John V. Fredd
BY H. Mathews Garland
ATTORNEY

PIPE COUPLING

This invention relates to pipe couplings and more particularly relates to couplings for interconnection of a pair of threaded members.

It is a particularly important object of the imvention to provide a new and improved coupling for threaded members.

It is another object of the invention to provide a pipe coupling which forms an extension joint assembly for interconnection of spaced pipe ends without rotation of either of such pipe ends.

It is another object of the invention to provide a pipe extension joint assembly which is adjustable in length without affecting the fluid-tight integrity of the threaded connections.

It is another object of the invention to provide a longitudinally adjustable pipe coupling which does not require gaskets for sealing against leakage.

It is another object of the invention to provide a pipe coupling which includes a leakproof straight threaded connection permitting longitudinal adjustment of the coupling.

It is another object of the invention to provide a pipe coupling which has first and second pipe members interconnected by an internally and externally threaded gland.

It is another object of the invention to provide a pipe coupling which may be tightened by turning a connecting gland while holding the connected pipe sections against rotation.

It is another object of the invention to provide a gland secured pipe coupling wherein the gland is secured by a straight threaded connection to one pipe and a tapered threaded connection to the other pipe.

It is another object of the invention to provide a pipe coupling of the character described which includes a connecting gland having internal and external threads tapered at different angles.

It is another object of the invention to provide a pipe coupling in which threaded ends of two pipe sections are interconnected by an internally and externally threaded gland which is rotatable along one of the pipe sections to permit adjustment of the length of the coupling between the sections and/or changes in the relative positions or alignment of the connected pipe sections.

It is another object of the invention to provide an articulated pipe assembly which is readily deformable from a straight line configuration to a multiplicity of curved arrangements dependent upon the number of sections making up the assembly and the degree of direction change at each coupling in the assembly.

It is another object of the invention to provide an articulated pipe assembly having a plurality of sections, each of which comprises several generally parallel pipe sections which are connected at opposite ends to other pipe sections by couplings in accordance with the invention to define a desired number of separate flow passages along the length of the pipe assembly.

It is another object of the invention to provide an articulated pipe assembly which is adjustable between various shapes to permit connection of a well head between well servicing equipment either at a location generally at the same elevation of the well head, with equipment vertically disposed over the well head, or with equipment at any location between the same elevation or vertically above the well head.

It is another object of the invention to provide an articulated pipe assembly which permits the shaping of the assembly from a straight to a number of curved configurations while maintaining the flow passage or passages through the assembly at curvatures which allow movement of pumpable tools along the flow passages throughout the lengths of the pipe assemblies.

These and other objects of the invention will be apparent from reading the following description of apparatus embodying the invention taken in conjunction with the accompanying drawings wherein:

FIGS. 1-A and 1-B taken together constitute a longitudinal view in section of an extensible pipe coupling embodying the invention positioned to connect spaced ends of a pair of pipe sections;

FIG. 2 is a view partially in elevation and partially in section of one form of articulated pipe assembly utilizing a coupling embodying the invention;

FIG. 3 is an enlarged view in elevation showing an end of one of the coupling bodies of the assembly of FIG. 2 and end portions of the curved pipe sections connected into the body;

FIG. 4 is a view in section along the line 4—4 of FIG. 3 showing the use of the pipe couplings embodying the invention for connecting pipe sections into opposite ends of the coupling body of one of the couplings used in the assembly of FIG. 2;

FIG. 5 is a view in section of another form of articulated pipe assembly employing pipe couplings embodying the invention with the assembly arranged in a curved shape;

FIG. 6 is a view partially in section and partially in elevation of the portion of the pipe assembly shown in FIG. 5 straightened so that the interconnected pipe sections generally extend along a straight longitudinal axis;

FIG. 9 is a view partially in section and partially in elevation of an alternate form of gland having straight inner threads and both tapered and straight outer threads;

FIG. 10 is a fragmentary longitudinal half section of a coupling embodying the invention including a gland having tapered inner and outer threads; and FIG. 11 is a fragmentary view in section and elevation of a coupling embodying the invention wherein the connected sections are aligned and tightening is effected by the gland.

Figures 7, 8:
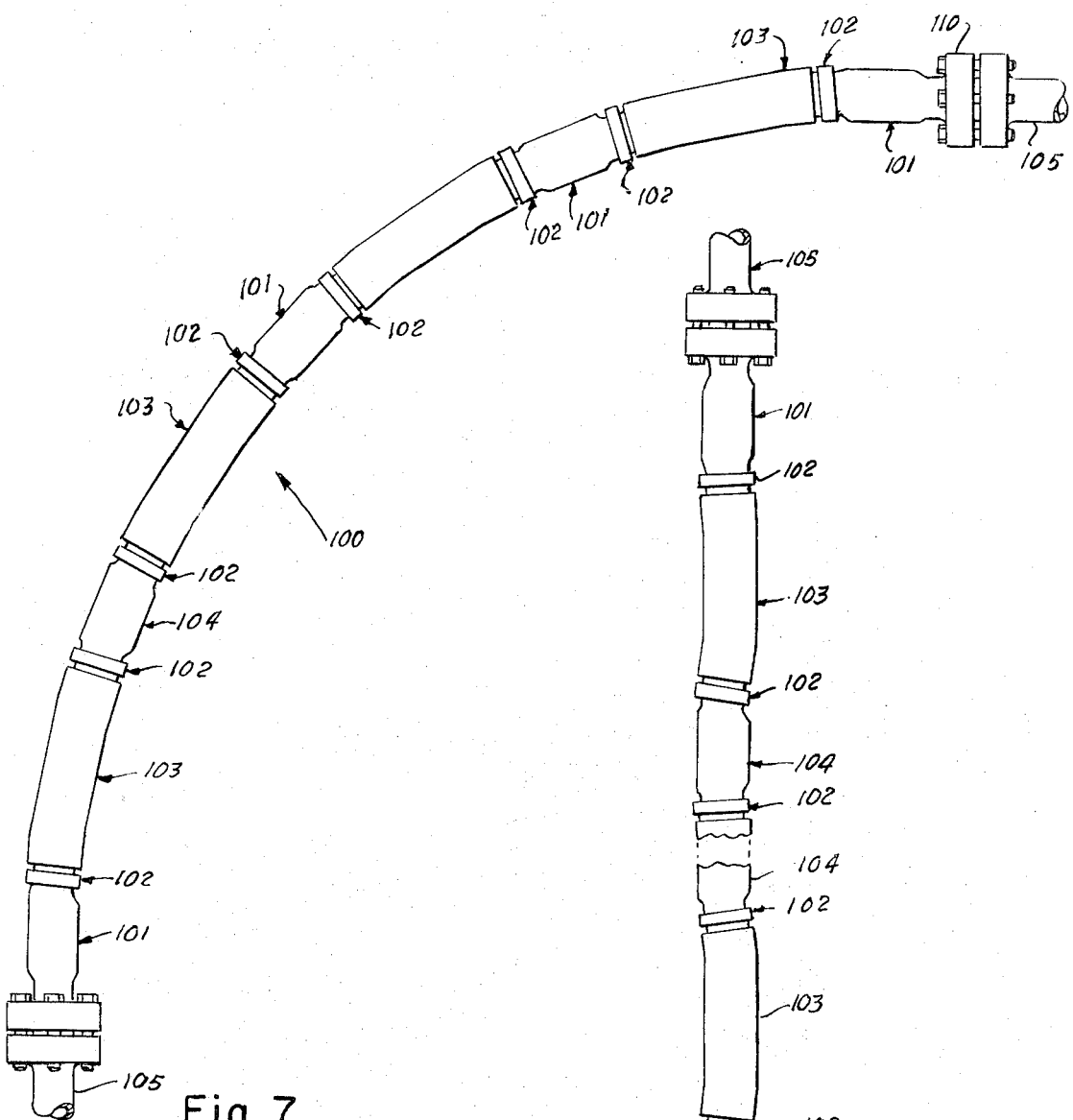
FIG. 7 is a view in elevation of an articulated pipe assembly using pipe sections of the type represented in FIGS. 5 and 6 with the assembly arranged along a curved axis to traverse a substantially 90° change of direction.
FIG. 8 is a broken longitudinal view in elevation of the assembly of FIG. 7 straightened to extend along a straight longitudinal axis.

In accordance with the principal feature of the invention there is provided a pipe coupling which forms a rotatable joint for connection of pipe ends. The coupling includes a first pipe section having tapered internal threads, a second pipe section telescopically disposed within the first pipe section and having external straight threads, and an interconnecting gland threaded between the first and second pipe sections provided with external tapered threads and internal straight threads. The gland has an exposed portion exterior of the overlap of the joined pipe sections to permit a wrench or other pipe tool to engage the gland for rotating it. The wedging effect of the mating tapered threads on the first pipe section and gland squeezes the gland radially inwardly to aid in effecting a seal along the mating straight threads of the gland and the second pipe section. The second pipe section is rotatable in the gland along the straight threads for adjustment of its position relative to the first pipe section while maintaining a fluid-tight seal effected along the straight threads. The coupling is useful as an extension joint for connecting spaced pipe ends. The coupling is also useful to form an articulated pipe assembly utilizing spaced connector bodies, each having separate laterally spaced, longitudinally extending bores provided at opposite ends with internal tapered threads into each of which is secured a gland having external tapered threads and internal straight threads. The glands threaded into the opposite ends of each of the bores are each connected with a curved pipe section. Several such clusters or bundles of curved pipe sections and connector bodies are interconnected to provide the articulated assembly. In another form of articulated pipe assembly using the pipe coupling of the invention, single sections of pipe of slight curvature are interconnected in sufficient number to permit shaping of the articulated assembly to desired degrees of curvature from a straight arrangement to a curve, such as 90°, depending upon the number of sections employed. In a further form of the invention pipe sections are connected by a gland having inner and outer threads of different tapers whereby gland rotation tightens a coupling without rotating the connected pipe sections.

Referring to FIGS. 1-A and 1-B of the drawings, spaced pipes 10 and 11 are connectible together by an extensible coupling 12 constructed in accordance with the invention without rotation of either of the connected pipes. The extensible coupling includes a first outer pipe section 13, a second telescopically disposed inner pipe section 14, and a connecting gland 15 which adjustably secures the first and second pipe sections together. The first pipe section 13 is provided with a thread 20 which is tapered outwardly toward the open end of the pipe section adjacent the gland 15. The tapered thread 20 mates with an external tapered thread 21 on the gland 15. The gland 15 has an internal straight thread 22 which extends along the gland a slightly greater distance than the external thread 21 and mates with an external straight thread 23 formed along a substantial portion of the length of the inner pipe section 14. The gland has an extended, slightly enlarged collar portion 24 which has any suitable external surface finish or shape, such as a multi-faceted surface or a knurled surface, to facilitate engagement of the collar portion by a tool, such as a wrench, for turning the gland. The threaded end portion of the gland having the threads 21 is provided with a hole 25 in which a ball member, such as a nylon ball 26, is inserted prior to connection of the two pipe sections by the gland. As the coupling parts are screwed together, the nylon ball is squeezed between the straight external threads 23 of the inner pipe section and the internal tapered threads 20 of the external pipe sections to enhance the seal between the threads of the gland and both of the pipe sections.

The internal gland thread 22 extends into the gland to a smooth bore portion 27 which extends to an internal bore end portion having threads 22a. The threads 22a are of the same form and dimensions as the thread 22 with, however, the thread crests cut off. The gland bore surface 27 with the thread surfaces 23 encompassed by the surface 27 defines an annular grease chamber 28 within the gland. A lateral bore 29 is formed in the gland opening into the annulus 28 for a grease fitting, not shown, through which grease is injected for lubricating the threads between the gland and the pipe 14. The threads 23 on the pipe 14 terminate a short distance from an external shoulder 14a providing a short, smooth surface 14b along the pipe between the threads 23 and the shoulder. The surface 14b is provided due to manufacturing difficulties of running the threads all the way against the shoulder. The threads 22a provide an internal bearing surface in the gland for gland support to compensate for a wrench on the end portion of the gland when turning the gland on the pipe 14 along the threads 23. The shoulder 14a when engaged by the end surface 24a of the gland at the position of FIG. 1-B prevents grease leakage as grease is forced into the annulus 28 before threading the gland away from the shoulder on the pipe 14.

The length of engagement along the straight thread portions of the gland and the pipe section 14, as substantially represented between the reference numerals 30 and 31, is a factor in the sealing capability of the coupling. Preferably, the character of the surfaces along which the gland threads 22 and pipe threads 23 are formed and the force wedging or urging the threads together, taken in conjunction with the length of engagement of the threads, presents sufficient resistance to fluid flow between the parts along the threads that, under the operating condition for which the coupling is designed, no leakage may occur from within the coupling along the gland. The nylon ball 30 enhances the seal between the threads to impede leakage which might occur spirally along the length of the gland's grooves defined by the threads. The force with which the straight threads are urged together is a direct function of the wedging effect of the gland 15 developed by the extent to which it is threaded into the outer pipe section 13 along the threads 20. As the gland is engaged with the threads 20 along the tapered threads 21 of the gland, the further the gland is threaded into the pipe section, the more the engaged portion of the gland is squeezed radially inwardly around the straight threads 23 of the inner pipe section. It has been found that the various factors which affect the sealing capability of the coupling, including the squeezing effect on the gland of the tapered threads and the length of engagement of the straight threads of the gland and the inner pipe section, provide a coupling which resists leakage at substantial operating pressures while remaining capable of longitudinal adjustment by rotation of the inner pipe section 14 relative to the gland 15. After the coupling is made up with the gland threaded into the outer pipe section to the extent sufficient to provide the desired seal between the gland and the inner pipe section along the straight threads, the outer pipe section 13 is readily rotatable for purposes of adjusting the length of the coupling.

In the form of the coupling illustrated in FIGS. 1-A and 1-B, the outer pipe section 13 is provided with internal tapered threads 31 along an upper end portion of the pipe section for engagement of the pipe section with external tapered threads 32 formed along the lower end portion of the pipe section 10. Similarly, the inner pipe section 14 has external tapered threads 33 formed along a lower end portion for engagement of the pipe section with the internal tapered threads 34 formed along an upper end portion of the pipe section 11.

The extension joint of the invention is particularly well suited to facilitate spacing-out, make-up, and the like, of tubing between two multiple string packers, such as packers useful with multiple strings in an oil well manufactured and sold by Otis Engineering Corporation. In such well arrangements, the coupling 12 is used to interconnect at least two pipe sections extending between two such multiple string packers. It will be apparent to those skilled in the art that in connecting such a pair of packers together by multiple pipe strings, some type of pipe coupling is necessary for interconnecting sections of the strings after make-up of the first string between the packers. Assuming the pipe sections 10 and 11 extend to spaced and aligned upper and lower packers and that the end portions of the pipe sections as shown are a distance apart within the length to which the coupling 12 can be extended, such coupling may be used to connect the pipe sections.

The coupling may be assembled by first threading the gland onto the inner pipe section 14 until the gland end face 24a engages the shoulder 14a on the pipe. As apparent from the previous description of the components of the coupling, the gland is threaded to the pipe section 14 by engagement of the straight threads 22 of the gland with the straight threads 23 of the pipe section. A grease fitting, not shown, is installed in the bore 29, and grease is forced into the gland annulus 28 around the threads 23 for lubrication and sealing. The seating of the gland end 24a on the shoulder 14a prevents leakage of the grease along the threads 22a during the initial grease injection. A nylon ball 30 is placed in the hole 25 of the gland and the pipe 13 is threaded on the gland. The tapered internal threads 20 of the outer pipe section are engaged with the external tapered threads 21 of the gland. Preferably, before tightening the gland in the outer pipe section, the length of the coupling is adjusted as near as practicable to the length of the existing gap or space between the pipe sections 10 and 11 so that minimum movement of the inner pipe section 14 will be required in connecting it with the section 11. The outer pipe section 13 is connected by its threads 31 to the threads 32 of the upper pipe section 10.

It will be apparent that any relative movement of the gland and the pipe 14 during spacing-out requires that the gland be threaded away from the shoulder 14a. The grease in the annulus 28 aids in rotating the gland and pipe 14 relative to each other. When all connections are made, the gland 14 is then finally tightened by engagement of a wrench with the portion 24 of the gland. The gland is threaded farther into the lower end portion of the pipe section 13 so that the mating tapered threads 20 and 21 of the pipe section and gland, respectively, squeeze the gland radially inwardly, thereby increasing the pressure between the gland and the inner pipe section 14 along the length of the mating straight threads 22 and 23 on the gland and pipe section. A fluid-tight seal is effected between the gland and the pipe section 14, leaving the pipe section, however, sufficiently free that it may be relatively easily turned in the gland. For example, one test coupling loaded to 5,000 pounds per square inch permitted rotation by the torque applied by hand by a 24-inch pipe wrench. The pipe section 14 is then rotated in the gland to thread the lower end portion of the pipe section into the pipe 11 by engagement of the threads 33 and 34 on the pipe sections 14 and 11, respectively. The fact that the pipe section 14 is rotatable in the gland without affecting the fluid-tight integrity of the extension coupling permits the pipe section 14 to be threaded into the pipe section 11 to complete the interconnection of the pipe sections 10 and 11 by the coupling. The design of the straight threads 22 and 23 and of the tapered threads 33 and 34 is such that the pipe section 14 is threaded through the gland and into the pipe section 11 at the same rate. It will be apparent and may be preferred that the gland 24 may be tightened after the connection of the coupling 12 between the pipe sections 10 and 11 is completed, though it is to be understood that the new and improved design of the coupling permits the gland to be initially tightened to the extent necessary to prevent leakage while still allowing rotation of the pipe section 14 in the gland for purposes of accommodating the coupling to the required spacing between the pipes connected together by the coupling. The length of the mating straight threads in the gland and on the inner pipe section, together with the inward wedging effect of the gland around the straight threaded portions caused by the outer tapered threads of the gland, along with other features, such as the finish of the threads on the inner pipe section in the gland and the tolerance between the two straight threaded sections, prevents the fluid pressure within the couplings from forcing any fluid along the straight threads out of the coupling, and thus prevents leakage. It will be evident that the sealing is accomplished by the coupling without the need for the use of ring seals or gaskets between the pipe sections of the coupling and the gland. Two spaced pipe ends are connectible together by the coupling without the need for rotation of either of the pipes being interconnected by the coupling. The only limitation on the distance which the coupling may be spaced out is the length of the straight thread 23 on the inner pipe section 14.

A form of articulated pipe assembly 40 using the coupling concept of FIGS. 1-A and 1-B is illustrated in FIGS. 2-4. The assembly 40 is especially adapted to connection of an underwater well head with fluid flow lines and well service lines which may extend horizontally, vertically, or at any intermediate angle with the well and well head. For example, the pipe assembly might be used to connect the well to facilities at generally the same elevation as the well head and may be raisable, however, to provide access to the well from a location generally vertically above the well head. A well head 41 is provided with a connector body 42 to which is secured handling apparatus 43. Connected into the upper end of the body 42 are first ends of a large diameter inner flow line loop 44, an inner small diameter hydraulic line loop 45, an outer large diameter flow line loop 50, and an outer small diameter hydraulic line 51. The other ends of the flow line and hydraulic line loops are connected with a first end of a middle coupling having a connector body 52 which is shown in enlarged detail in FIG. 4. Another set of flow and hydraulic line loops 44', 45', and 50', 51', are connected at first ends into the other end of the middle connector body 52. The other ends of the loops 44', 45', 50', and 51' are connected with another middle connector body 52' which is identical in structure to the body 52. Still another bundle of flow and hydraulic line loops may be connected into the connector body 52', or, if conditions permit, the other end of the body 52' may be connected with flow lines 44" and 50" and hydraulic lines 45" and 51" which may either extend to well facilities at the surface or may extend to such facilities at or near the elevation of the well head, not shown.

As shown in FIGS. 3 and 4, the connector body 52 is a generally cylindrical member having separate longitudinal transverse bores corresponding in number and size to the hydraulic and flow line loops connected into the body. Referring to FIG. 4, the body 52 has a bore 53 into which the hydraulic loops 51 and 51' connect and a bore 54 into which the flow line loops 44 and 44' connect by means of couplings embodying the invention. The body 52 has end recesses 55 and 55' which, as represented in FIG. 3, encompass a sufficient portion of each end of the body to permit the flow line loops 44 and 44' to connect into the body at a greater depth toward the longitudinal center line of the body so that the inner flow line loops may be of the same length as the outer flow line loops, thereby minimizing the number of parts of different specifications or sizes which are necessary for the complete articulated assembly. Thus, by recessing the coupling body, as shown, the inner and outer flow line loops 44 and 50 may be of the same length and radius of curvature and thus are interchangeable.

The flow line loop 44 is connected into the bore 54 of the body 52 by a gland 60 which corresponds in function to the gland 15 shown in FIG. 1-B. The end of the flow line loop 44 inserted into the body 52 is provided with straight external threads 61 along a portion of the length of the end section of the loop inserted into the bore 54 of the body. The gland 60 has straight internal threads which mate with the straight external threads 61 on the flow line loop. Externally, the gland60 is provided gland 60 tapered threads 63 which mate with tapered internal threads 64 provided along an enlarged first end portion of the bore 54. The loop 44 also has a smooth end portion 65 which extends into the body 52 inwardly of the tapered threaded portion 64 of the bore. An O-ring seal 70 is fitted in an internal annular recess 71 of the body around the bore 54 to seal with the end portion of the loop 44. The compressing effect of the tapered threads of the body 52 and the gland 60 squeeze the gland radially inwardly along the straight threaded connection between the gland and the flow loop 44. The length of the straight threaded connection between the flow line loop and the gland acting under the pressure imposed along the threads by the tapered threads provides a seal along the straight threads while allowing the end portion of the flow line loop 44 threaded into the gland to rotate relative to the gland in the same manner as described in connection with the coupling 12.

The end portion of the flow line loop 44' connected into the other end of the bore 54 of the body 52 is coupled with the body by identical structure referred to with the same reference numerals having a prime mark (') added thereto. Inasmuch as the outer flow loops 50 and 50' are identical to the inner flow line loops, the structure coupling the loops into the body 52 are identical and thus referred to by the same reference numerals as used in the above description. Similarly, the outer hydraulic line loop 51 is coupled into the bore 53 of the body 52 by a gland 80 which has tapered external threads 81 and straight internal threads 82. The external threads 81 mate with tapered internal threads 83 of the body 52 around its bore 53. The internal straight threads 82 of the gland mate with external straight threads 84 on the end portion of the hydraulic line loop. A smooth end portion 85 of the loop 51 inwardly of the straight threads 84 is inserted into the body bore 53 inwardly of its tapered threaded region with a seal being effected around such portion by an O-ring 90 disposed within an annular recess 91 of the body 52 around the bore 53. The outer hydraulic line loop 51' connected into the other end of the bore 53 is held by the gland 80' and sealed with the body 52 by the O-ring seal 90'. The inner hydraulic lines 45 and 45' are connected into the bore 53' by the same gland and seal structure as used for the outer hydraulic line loops.

The structure of the well head body 42 into which the lower ends of the pipe loops 44, 45, 50, and 51 are connected and identical to one of the end portions of the body 52, and the pipe loops are connected into the body 42 by the same coupling arrangement using the glands as shown and described with respect to the body 52. Thus, the pipe loop bundle connected into the well head body 42 is rotatable and twistable relative to the well head body in the same manner as the pipe loops are with respect to the body 52. The lower end of the well head body 42, not shown, is secured in any suitable manner into the well head 41 to connect the flow passages of the body with flow passages through the well head which lead to corresponding flow and hydraulic lines extending down into the well, not shown.

The structure of the connections of the various line loops into the body 52' is identical to that shown and described with respect to the body 52 so that the lines, both flow and hydraulic lines, connected into the several bodies of the assembly 40 are all rotatable in the coupling bodies by virtue of the straight threaded connections of the lines with the glands securing the lines into the bodies. The lines 44", 45", 50", and 51", shown in cross-section only in FIG. 2, may be another set of loop pipe sections connected into still another coupling body identical to the body 52 to provide added flexibility to the assembly 40. If the added loop sections are not needed, the lines 44", 45", 50", and 51" may extend to well servicing, fluid storage and processing, and other such facilities at some remote location from the well head. These facilities may be on land, on a platform in shallower water, in a submerged station, or on a floating platform.

The coupling body 52 and the other such bodies in the pipe assembly have been shown with the end recesses 55 and 55' so that both the inner and outer flow line loops may be made to the same specifications and thus be interchangeable. Due to the large size of the flow line loops and consequent difficulty of handling them on location, this interchangeability is particularly desirable. The coupling bodies are not, however, provided with similar recesses for coupling the inner hydraulic line loops into the bodies, principally for the reason that the much smaller hydraulic line loops are much more flexible and may be more readily cut, threaded, and manipulated on the job than the larger flow line loops and, additionally, the provision of the added end recesses in the coupling bodies for the inner hydraulic line loops would substantially increase the manufacturing cost of the coupling bodies. It is to be understood, however, that such considerations do not eliminate the use of such end recesses for the hydraulic line loops if they are desired. If such additional recesses are formed or if the recesses 55 and 55' are enlarged to encompass the area of connection of the inner hydraulic lines into the bodies, it then would be possible to provide interchangeable inner and outer hydraulic line loops.

The assembly 40 is particularly flexible and thus may be moved through a substantial arc at the end of the assembly defined by the body 52', and otherwise twisted and bent to a number of different desired shapes. In the configuration of the assembly represented in FIG. 2 the flow lines 44" and 50" and hydraulic lines 45" and 51" turn horizontally toward the observer. In the event that it is desired to raise the flow and hydraulic lines to vertical positions, they may be lifted, thereby moving the body 52' upwardly tending to twist the bundle of lines 44', 45', 50', and 51' in a clockwise direction as viewed to the left of the reader toward the body 52. As the body 52' is raised, the resistance to twisting of the various lines will cause the ends of the lines secured by the glands into the body 52 to be rotated to some extent in the body as permitted by the straight threaded connections of the glands with the lines. Similarly, the lines will be twisted along their lengths between the body 52' and the body 52. The body 52 will be rotated clockwise, transferring some twist to the lines 44, 45 and 50, 51. The extent to which the lines are twisted and bent about their own longitudinal axes will depend, of course, upon the flexibility of the material of which the lines are made, the thickness of the walls forming the lines, and the length of the lines. The body 52 is raised until it is in a vertical position so that the lines 44", 45", 50", and 51" connected with it may extend to the surface to a vessel or other facilities above the well head. The turning capability of the lines where they connect into the bodies 42, 52, and 52', together with the capacity of the lines to twist about their own axes and about themselves, permits a great deal of flexibility in maneuvering the body 52' to a desired position relative to the well head. As mentioned, additional sections may be included in the assembly by adding more flow and hydraulic line loops interconnected by coupling bodies such as the body 52. The particular radius of curvature of the flow and hydraulic line loops is selected to provide a flow passage in each line capable of accommodating a string of pumpdown tools with a minimum of resistance to tool movement along the curvature. Approximately a 5 foot radius has been found to be quite satisfactory for this purpose. After the assembly 40 has been raised and well servicing from above the well is completed, the assembly is readily returnable to the condition shown in FIG. 2 for resumption of production.

The use of couplings embodying the invention in the pipe assembly 40 not only provides a flow system having maximum flexibility with minimum concern for sealing against leakage but also, quite importantly, provides a system wherein a minimum number of replacement spare parts are needed for the interchangeability of the inner and outer hydraulic and flow line loops, and minimum time and effort is required for replacement of any one or more of the components due to the simplicity of the construction when using the glands for connecting the loops into the coupling bodies. Additionally, the use of the new and improved coupling of the invention makes it possible to assemble and service an articulated unit of the type shown without the need for additional extension joints between the coupling bodies.

The loop bundles or sections of the pipe assembly 40 are especially useful in making ocean floor completions in the drilling of subsea wells such, particularly, as oil wells. The assembly 40 permits well tubing strings, the well head, and risers which are adapted to extend to the surface to be run simultaneously by means of drill pipe connected with the member 43. It will be apparent that the member 43 would be equipped with a suitable connection for support from a string of drill pipe. After so running this equipment, pressure and production tests, if desired, are made and the risers are buoyed off for later pick up by a pipe laying barge. As the barge moves off, the lines are then easily laid down. These various maneuvers are readily accomplished due to the flexibility of the connection between the risers and the well head made through the articulated pipe assembly 40. Since the assembly permits vertical and horizontal connection and is adjustable over the range between such connections, the risers are readily laid down and lifted between vertical extension to the surface and horizontal extension along the ocean bottom. After these maneuvers are performed with the pipe assembly and the lines are laid down for production and well servicing and other procedures to be accomplished through the line, the coupling glands such as 60, 60', 80 and 80' may be further tightened by either a diver or a suitable submarine system for engaging and manipulating the functional parts of the pipe assembly.

Referring now to FIGS. 5–8, another articulated pipe assembly 100 is illustrated for such uses as making well head connections similar to that of the assembly 40 in FIG. 2. The assembly includes a plurality of interconnected identical flanged pipe end sections 101, glands 102, pipe collar sections 103, and sub- or pin- pipe sections 104. In FIG. 7, the pipe assembly is shown in one preferred assembly arrangement which provides a 90° flow line turn, while FIG. 8 represents an important functional feature of the pipe assembly which is the capability of being straightened to provide a substantially straight flow line. One especially important use of the flow line assembly is the same as that previously discussed for the assembly 40 which is the use of the assembly on a well head which, during one stage of operation, is connected with facilities which require a generally horizontal flow line connection to the well head while capability of vertical entry into the well head is desired for servicing purposes. The articulated assembly 100, as illustrated, is connected at opposite ends to identical flow line flanged pipe sections 105, one of which may be connected into a well head or any desired line while the other is connected with a flow line leading to fluid storage, well servicing, and other required facilities, not shown.

Specific details of the component parts of the articulated pipe assembly 100 are illustrated in FIGS. 5 and 6. Referring to FIG. 5 the flanged section 101 has an end flange 110 provided with circumferentially spaced bolt holes 111 to receive bolts 112 which secure the flange to the flanged end of the flow line section 105. A gasket 113 is disposed in cooperating end recesses in the flanges 110 and the flange on the pipe section 105 for sealing around the bore through the flanged coupling to prevent leakage between the flanges. The flange section 101 has a body portion 114 provided with a bent or angularly disposed externally threaded end portion 115. The axis of the end portion 115 extends at a slight angle to the axis of the central body portion of the body 115, the degree of which depends upon the total number of sections of collar and subportions included in the complete assembly 100 and the total degree of curvature traversed by the complete assembly. In the particular design of the assembly 100 the axis of the threaded end portion 115 lies at an angle of 5 ⅝ with the axis of the main body portion 114 of the flanged section 101. The end portion 115 has external straight threads 120 which are cut on the end portion on a center line or axis which is coincident with the angularly disposed axis of the end portion 115. The body 114 has a bore 121 which is of irregular configuration having a somewhat "out-of-round" cross-section to more readily accommodate a train of pumpdown tools as it traverses the curved bore defined by the assembly of parts comprising the articulated pipe assembly 100. This irregular bore configuration is achieved by forming the lower half 121a, or 180° of the bore along the lower half of the body, as shown in FIG. 5, with a cylindrical surface formed on a straight longitudinal axis of the body 114. The upper half surface portion 121b of the bore, as shown in FIG. 5, is a longitudinally curved surface, half-circular in cross-section, developed relative to a curved longitudinal axis line having a radius equal to the radius of curvature of the total assembly 100, as viewed in FIG. 7, when it is in its curved configuration. Thus, the surface 121b is generated along an axis which extends near the center line of the bore 121, such axis being formed on a 5 foot radius so that the total assembled curvature of the assembly 100 is arranged along a 5 foot radius to facilitate the movement of pumpdown tools through the pipe assembly. To aid in better understanding the development of the surfaces 121a and 121b defining the bore 121, axis lines are illustrated along the bore and about which the two surfaces are developed. The cylindrical surface 121a is thus developed along the longitudinal axis 121aa, while the non-cylindrical upper bore surface 121b is developed along the curved longitudinal axis 121bb which has a radius R which, in the particular preferred design for standard pumpdown practice, is approximately 5 feet. The previously discussed axis 115a of the end section 115 is aligned at the 5 ⅝° angle with the axis 121aa.

The gland 102 has a tool-engaging extension portion 130 for securing a wrench or similar tool to the gland and a threaded portion 131 which functions to connect the collar section 103 to the flange section 101. The gland portion 131 has straight internal threads 132 which mate with the straight external threads 120 on the end portion 115 of the pipe section 101. The section 131 also has tapered external threads which generally taper inwardly toward the end of the gland for engagement within the pipe collar section 103. The collar section 103 has an end portion 140 provided with tapered internal threads 141 which mate with the tapered external threads 133 of the gland for securing the gland in the end portion of the collar section. When the gland is tightened to the proper degree in the collar section end portion, the tapered threads of the collar section and the gland supply the required inwardly squeezing force to the gland to hold the straight threaded connection between the gland and the end portion 115 of the pipe section 101 in a sealed, yet rotatable, relationship. Thus, when properly secured together, the straight thread connection between the gland and the pipe section 101 permits the gland and the pipe section 103 to rotate on and relative to the pipe section 101 without affecting the fluid tightness of the coupling of the pipe assembly.

The pipe collar section 103 has a central body portion 142 extending a major portion of its length and is provided with an internally threaded end portion 140 and an identical internally threaded opposite end portion 143. The end portion 143 has internal tapered threads 144. The axis of each of the end portions 140 and 143 of the pipe section 103 lies at a slight angle with the principal axis of the main body portion 142 of the pipe section. In this particular design this angle is 5 ⅝° which, as previously stated, is the same angle of alignment of the end section 115 with its main body portion 114 of the pipe section 101. The net cumulative effect of the angular position of the adjoining pipe end portions 115 and 140, since they each lie at an angle of 5 ⅝° to the axis of the main body portion of the members of which they are a part, is to position the pipe sections 101 and 103 at an angle of 11 ¼° with respect to each other when the pipe sections are at the maximum angle with respect to each other, as shown in FIG. 5, at their fully turned relative positions.

Thus, since each of the end portions of the pipe section 103 lie at an angle of 5 ⅝° to the central axis of the pipe section, the pipe section provides a total turn of 11 ¼° when functioning in the assembly 100. The bore 145 of the pipe section 103 has an irregular shape of the same type as the bore 121 in the pipe section 101. The lower half surface 145a of the bore at the position of the pipe section of FIG. 5 encompassing substantially the lower 180 degrees of the bore is a cylindrical surface generated about an axis which comprises a longitudinal axis of the main body portion 142 of the pipe section. The upper half of the bore surface comprising the upper 180° of the bore, as viewed in FIG. 5, is a curved surface 145b, semicircular in cross-section, and generated along a longitudinal axis of the same radius and from the same center as the radius R for the surface 121b of the pipe section 101 to facilitate the movement of a train of pumpdown tools through the pipe assembly 100.

A sub- or pin- pipe section 104 is connected by another gland 102 to the pipe section 103. The pipe section 104 is structurally and dimensionally very similar to the flanged pipe section 101 except that the section 104 has identical angularly disposed opposite end portions 150, each of which is externally threaded with straight threads to engage a gland 102. Referring specifically to FIG. 5, the pipe section 104 has an end section 150 provided with straight external threads 151 which mate with the internal straight threads 132 of the gland 102. The end section 150 of the pipe section 104 is formed on an axis at an angle which, in this particular design, lies at 5 ⅝° with the principal axis of the pipe section, such axis being the axis of the central main body portion 152 of the pipe section 104. The opposite end of the pipe section 104, not shown, has an identical angularly disposed end portion 150 externally threaded with straight threads which will mate with the internal straight threads of another of the glands 102. The bore 153 through the pipe section 104 is of irregular shape having a lower cylindrical surface section 153a encompassing substantially 180 degrees of the length of the pipe section as viewed in FIG. 5. The upper 180°, as seen in FIG. 5, of the bore 153 has a surface 153b which is semicircular in cross-section and longitudinally formed on a radius R corresponding to the radius of the curved total assembly 100 which, in the particular design shown, is approximately 5 feet. Thus, the pipe section 104 readily accommodates a moving pumpdown tool train and provides a turn of 11 ½° as is provided by the other pipe sections. The pipe section 104 is rotatable in the gland 102 along the straight line connection relative to the gland and the pipe section 103 without affecting the fluid-tightness of the coupling between the pipe sections 103 and 104 as previously discussed.

The number of pipe sections 103 and 104 connected between the end flanged sections 101 at the opposite ends of the assembly 100 are sufficient to provide a 90° turn in the articulated loop formed by the pipe sections between the flanged end sections. Referring to FIG. 7, viewing each coupling or joint at each of the glands 102 as providing 11 ½° turn, the total turn of the loop formed by the assembly in the positions shown in FIG. 7 traverses 90°. Since each of the joints is comprised of two angularly positioned end portions of pipe sections, each set at 5 ⅝° to the principal axis of the pipe section, the total turn provided at the joint is 11 ½°. Since there are eight such joints in the assembly 100, it will be apparent that the total cumulative turn provided by the joints is 90°.

Each joint at each gland 102 in the assembly 100 has the capability of rotation without affecting the fluid tightness of the pipe assembly within, of course, practical limits of disconnection of the joint by unscrewing the gland from the pin portion of the pipe to which it is threaded and, within that extreme limitation, unscrewing of the gland to the extent that the fluid-tight integrity of the joint is affected. So long as these extremes are not exceeded and sufficient straight thread contact is maintained to keep the joint fluid tight, the connected pipe sections may be rotated, one relative to the other. Referring specifically to FIGS. 5 and 6, each joint may be rotated 180° to effectively straighten the connecting pipe sections. Since each pipe section has an end portion set at an identical angle to the other, rotation of one pipe section relative to the other effectively cancels the degree of turn at the joint to thus straighten one pipe section relative to the other. For example, referring to FIG. 5, rotation of the pipe section 103 relative to the pipe section 101, thereby turning the pipe section 103 and its associated gland 102 through 180°, effectively cancels the turn at the joint between the pipe sections so that the two sections are thereby rendered straight as shown in FIG. 6. In FIG. 5 the angularity of the end portion 115 on the pipe section 101 and that of the end portion 140 on the pipe section 103 is downwardly in both instances. In contrast, in FIG. 6 the angularity of the end portion 115 of the pipe section 101 is still downwardly while the angularity of the end portion 140 of the pipe section 103 is upwardly so that it will be seen that the net result is straightening of the joint. The pipe section 104 is then revolved in its gland 102 180°, thereby cancelling the cumulative turn provided at the joint between the pipe sections 104 and 103 to straighten such joint. Thus, the rotation of each pipe joint relative to the adjacent pipe joint to which it is connected through 180° straightens the relationship between the adjoined pipe joints. The pipe joints may be rotated in either direction so long as a full 180° is traversed. The cumulative effect of 180° rotation of each of the pipe joints in the assembly 100 produces an effectively straight pipe assembly as shown in FIG. 8. Alternative direction of rotation of the joints may be employed so that at either end of the assembly it should never be necessary to revolve either of the flanged flow line sections 105 more than 180°.

For example, the flanged end section 101, shown in FIG. 5, may be rotated toward the observer 180°, thereby straightening the section 101 relative to the section 103 and the gland 102 joining the section 103 to the section 101. Then, the sections 101 and 103, along with the gland 102 joining the section 104 to the section 103, may be revolved as a unit 180° back toward the observer, thereby straightening the section 103 relative to the section 104; and since a straight relationship already exists between the sections 101 and 103, the three sections, 101, 103, and 104, now are straight as seen in FIG. 6. Next, the three sections may be revolved as a unit 180° to provide a straight relationship with the fourth pipe section. This sequence of 180° revolution of the straightened segments of the assembly 100 is continued until the whole assembly is straight and vertically aligned as shown in FIG. 8. Also, it will be recognized that if each section 103 is revolved 180° from the relative postions of FIG. 7, the entire assembly is straightened to the configuration of FIG. 8 without rotation of either end flange 110.

Thus, the assembly 100 provides a mechanism whereby a well may be connected to a flow line running along or near the ocean bottom to horizontally spaced well facilities, and when it is desired to gain vertical access to the well for various well servicing procedures which might require direct straight access in through the well head, the articulated coupling 100 may be lifted and alternately revolved until it is straightened to the shape of FIG. 8, such straightening being accomplished without affecting the fluid tightness of the pipe assembly.

It will be evident that the use of the coupling concept described and illustrated in FIGS. 1-A and 1-B permits the new and novel structure of FIGS. 7 and 8. If the line 105 is sufficiently flexible running from the well head articulated coupling, the straightening procedure may be accomplished without disconnection of the line since no more than 180° rotation is ever required to effect the straightening.

In addition to providing an articulated structure which may be manipulated between straight and curved shapes, the pipe assembly 100 also provides an adjustable flow coupling assembly for the connection of spaced flanges which are disposed along different axes. For example, referring to FIG. 7, presuming the flanges 105 are fixed as shown to immovable pipes aligned at 90° angles with each other. An assembly 100 has the adjustable capability of connection of the two spaced flanges 105 by rotation of the pipe sections making up the assembly sufficiently to accommodate it to the spacing of the flanges. It will be apparent that initially an assembly 100 must be selected which approximately fits the spacing between the flanges. The assembly may then be connected at one end leaving the other end free for adjustment to accommodate the assembly to the end flange 105 spacing. If the lower pipe section 101 is connected with the lower flange 105 and the upper flange 110 on the upper pipe section 101 is slightly above or below the flange 105, the position of the flange 110 may be altered by rotating the adjacent pipe section 103 a full 360° in either direction to effectively lengthen or shorten assembly 100 as needed. Similarly, if the flange 110 is displaced with respect to the flange 105 such that the flange 110 requires movement inwardly or outwardly relative to the flange 105, rotation of one or more of the pipe sections 103 a full 360° may be employed to make the necessary adjustment in the assembly 100 for coupling its upper flange 110 to the flange 105. Thus, any one or more of the pipe sections 110 may be rotated a full 260° at least one or two turns for effectively shortening or lengthening the pipe assembly and also changing the effective radius of the assembly. These adjustments may be made so long as no one of the threaded connections is rotated sufficiently to jeopardize the tightness of the connection or affect the seal integrity of the coupling. Thus these adjustments may be made within limits which retain metal-to-metal seal integrity. The adjustability of the assembly 100 is particularly important where use in a confined submarine wellhead cellar or in an ocean floor environment is desired. These adjustments may be made with a small wrench and thus permit the articulated pipe assembly to be accommodated to variation in length and radius requirements by use of tools which can be manipulated in confined spaces or under adverse conditions such as when being operated by divers or submarine equipment.

Referring to FIG. 9, an alternate form of coupling gland 160 is illustrated for use in such applications as the articulated pipe assembly of FIGS. 5-8 in lieu of the gland 102 to produce a greater stress concentration along a portion of the rotatable straight thread connection. The gland 160 also represents a design concept which may be applied to the gland 15 for effecting an increase in stress concentration along the straight threaded connection. The gland 160 has a threaded coupling portion 161 and an extension 162 provided with a plurality of flat side faces 163 for engagement of a suitable tool, such as a wrench, for rotating the gland. The threaded portion 161 includes internal straight threads 164 adapted to engage similar external straight threads, such as the threads 131 on the end portion of the pipe sections 101 of the pipe assembly 100. Externally, the gland portion 161 has threads formed at two angles or degrees of taper. The threads 165 extending from a line 170 to a line 171 are straight threads or threads of slight taper while the threads 172 extending from the line 171 to the end 173 of the gland are of a much move severe or higher angle of taper. The threads 172 produce a higher stress concentration along that portion of the gland on which the threads are formed than exists along the other threaded portions of the gland so that a correspondingly higher stress concentration is effected along the threads 164 which are aligned longitudinally with the threads 172 on the gland, thus causing a tighter sealing relationship along the joint between the threads 164 and the straight threads of the pipe member on which the gland 160 is threaded. The gland 160 otherwise functions identically to the gland 102 and is used just in those instances where the higher stress concentration is desired for improved sealing along a coupling.

FIG. 10 illustrates a coupling 180 embodying the invention which includes a gland 181 to connect tubular members 182 and 183. The coupling 180 is particularly useful in situations where the structure of the member 182 does not permit it to be readily engaged by a tool, such as a wrench, while the gland 181 can be held against rotation while the member 183 is rotated by a wrench or other suitable means. One such arrangement where these conditions might exist is in the case of the member 182 being an externally smooth, highly polished tube having no surfaces engageable by a wrench. The gland 181 has a threaded portion 184 and an extension portion 185 having an external surface 190 which is adapted to be engaged by a wrench or other similar tool. The threaded gland section 184 has internal inwardly tapered threads 191 and external, more steeply tapered threads 192. The internal threads 191 engage similarly tapered threads 193 on the member 182. The external gland threads 192 engage internal tapered threads 194 within the member 183. The steeper taper of the external threads on the gland permits a seal to be effected along the internal threads of the gland with the member 182 without the necessity of applying high torque between the gland and the member 182. For example, the gland 181 is threaded on the member 182 and tightened lightly to the extent that torque can be applied to the gland without the need of using a wrench on the member 182. In so doing, the internal threads 191 of the gland are fully engaged with the external threads 193 of the member 182 without, however, any severe tightening of the gland on the member 182. The member 182 is then threaded on the gland by engagement of the internal threads 194 with the external gland threads 192. One wrench is then engaged with the gland to hold it against rotation while another wrench is engaged with the member 183 for rotating the member relative to the gland. The steeper taper of the threaded engagement between the external threads of the gland and the internal threads of the member 183, when torque is applied to the member 183, increases the stresses in the threaded portion of the gland radially inwardly to effectively tighten the internal threaded connection of the gland with the member 182, thereby effecting a seal along the connection between the threads 191 and 193. The gland is effectively tightened on the member 182 by virtue of the steeper thread connection between the gland and the member 183 as compared with the thread connection between the gland and the member 182.

FIG. 11 illustrates a still further form of tubular member coupling 200 which is used to achieve a sealed threaded joint between two tubular members after the members have been aligned at desired positions relative to each other. The coupling includes a gland 201 which interconnects a first tubular member 202 with a second tubular member 203. A further tubular member 204 is illustrated disposed through the member 203, such member, however, comprising no part of the coupling 200. The gland 201 has internally and externally threaded portion 205 and an extension portion 210 having a plurality of flat faces 211 to permit the engagement of a wrench for rotation of the gland. The threaded gland portion 210 has external straight threads 212 which mesh with internal straight threads 213 in the member 202. The threaded gland portion 210 also has internal tapered threads 214 which mesh with external tapered threads 215 on the tubular member 203. The internal gland threads 214 taper from a maximum diameter at the extension 210 to a minimum diameter at the end 215a of the gland so that the end 215a is thicker than the threaded gland portion adjoining the extension 210. Similarly, the taper of the external threads 215 on the member 203 is from a minimum diameter at the end 210a to a maximum diameter at the base end of the threads 210b. Stated otherwise, the threads 212 and 214 are diverging at the end 215a of the gland.

A primary objective of the coupling design 200 is the capability to be tightened without affecting a preset alignment between the members 202 and 203. Thus, in one procedure of assembly of the coupling, the tubular members 202 and 203 are threadedly interconnected with the gland 201, and the three members are threaded together until the desired relative positioning is achieved between the members 202 and 203. For example, such positioning may comprise the longitudinal spacing of given features or marks on the tube members at a predetermined distance from each other. With the two members coupled by the gland aligned as desired, the members are both held against rotation while the gland is engaged by a wrench contacting the surfaces 211 and rotated in a direction, depending upon whether right- or left-hand threads are employed, which threads the gland farther on the member 203, thereby more tightly engaging the mating threads 214 and 215. The tapered threaded connection between the gland and the member 203 stresses the gland radially outwardly, thereby tightening the straight threaded connection comprising the threads 212 and 213 between the gland and the tubular member 202. The gland is torqued to a predetermined value, such as to about 1,200 foot pounds, to obtain the desired tightness between the gland and the tubular members for achieving an effective seal along the tapered and straight threaded connections. If desired, the gland and tubular members are welded circumferentially at 220 and 221. Thus, the coupling 200 permits interconnection of tubular members at desired relative positions and a tightening of the threaded connections with the members to a desired value without affecting the relative preset positions of the members. The structure of the coupling of FIG. 11 additionally permits assembly and testing and subsequent removal of the inner member 203 to permit welding at 221 with the internal members removed, if such internal members are heat sensitive. Later welding at 220 may then be accomplished at a distance farther from internal heat sensitive components which may be affected by the weld at 221.

It will be evident that other combinations of pipe sections and fluid-tight rotatable couplings may be used to form articulated pipe assemblies capable of assuming various desired shapes and capable of being shifted to such shapes while retaining fluid tightness. The changing of the degree of angularity of the end portions of the pipe sections may provide other desired changes in the total angle of turn at any one of the joints.

What is claimed and desired to be secured by Letters Patent is:

1. A coupling for providing a connection between first and second threaded members comprising: a first member having a portion provided with straight external threads; a second member having a portion provided with tapered internal threads; a coupling member between said first and second members, said coupling member having straight internal threads mating with said straight threads on said first member and said coupling member having tapered external threads mating with said tapered internal threads in said second member; the threaded connection between said coupling member and said first member and the threaded connection between said coupling member and said second member being disposed longitudinally in concentric overlapping relationship; the threaded connection between said coupling member and said second member effecting a radial stress on said coupling member providing a sealing force along the threaded connection between said coupling member and said first member; the finish of said coupling member and said first member along the straight threaded connection between said coupling member and said first member and the tolerance between said straight threads of said coupling member and said first member being related to and the length of such threaded connection being proportional to the operating pressure of fluid within said coupling to permit said first member to be hand-rotated in said coupling member while maintaining a fluid-type connection at said coupling member along said straight threaded connection between said coupling member and said first member under operating pressure; said coupling member being provided with an extension portion projecting beyond said overlapping portions of said first and second members for engagement of a tool on said coupling member for rotating said coupling member for loosening, tightening, and adjusting the effective length of said coupling; said extension portion of said coupling member having a smooth internal bore portion disposed between the outward end of the internal threads along said coupling member and the free end portion of said coupling member providing a grease annulus for receiving grease to lubricate said straight threaded connection between said coupling member and said first member; said coupling member having a grease-fitting opening communicating with said grease annulus for injection of grease into said annulus; and said coupling member having internal threads along said free end portion to seal the outward end of said annulus and to provide structural support for said free end portion of said coupling member along said first member.

2. A pipe coupling for connecting two pipes to provide a sealed rotatable joint between said pipes comprising: a first inner pipe section having a portion thereof provided with external straight threads; a second outer pipe section having a portion thereof provided with internal tapered threads; a coupling gland for interconnecting said first and second pipe secions, said coupling gland having internal straight threads formed to mate with said straight threads on said inner pipe secton, said coupling gland having external tapered threads to mate with said internal tapered threads in said outer pipe section; said tapered threads of said gland and said outer pipe section being so related to effect radially inwardly squeezing action on said gland as said gland is threaded into said outer pipe section; said straight threads within said gland and around said inner pipe secton mating along a length proportional to the operating pressure within said pipe coupling to effect a fluid seal between said gland and said inner pipe section to seal against said operating fluid pressure within said coupling when said coupling gland is squeezed by said action of said tapered threads on said coupling gland and within said outer pipe section, said inner pipe section being hand rotatable in said coupling while maintaining said fluid seal for adjusting the effective length of said coupling under said operating fluid pressure; said coupling gland having an extension portion projecting from within said outer pipe section along the external threaded portion of said inner pipe section, said extension portion being provided with a smooth internal bore portion spaced from the outer free end portion of said gland to provide an annular grease chamber around said straight threads on said inner pipe section to contain grease for lubricating said inner pipe section for rotation of said inner pipe section within said gland, said gland having a grease fitting opening to permit injection of grease into said annular grease chamber; and said gland having internal threads along said free end portion for closing the outward end of said grease chamber and for supporting the free end of said gland on said straight external threads of said inner pipe section.

* * * * *